United States Patent
Herington et al.

(10) Patent No.: US 8,082,547 B1
(45) Date of Patent: Dec. 20, 2011

(54) REALLOCATING HARDWARE RESOURCES AMONG WORKLOADS IN ACCORDANCE WITH LICENSE RIGHTS

(75) Inventors: Daniel Edward Herington, Richardson, TX (US); William H Blanding, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1239 days.

(21) Appl. No.: 11/590,584

(22) Filed: Oct. 31, 2006

(51) Int. Cl.
*G06F 9/46* (2006.01)
(52) U.S. Cl. ............... 718/104; 713/1; 713/158; 705/59
(58) Field of Classification Search ................... 718/104
See application file for complete search history.

(56) References Cited

U.S. PATENT DOCUMENTS

| | | | | |
|---|---|---|---|---|
| 5,579,222 | A * | 11/1996 | Bains et al. | 717/167 |
| 5,745,879 | A * | 4/1998 | Wyman | 705/1.1 |
| 6,859,793 | B1 * | 2/2005 | Lambiase | 705/39 |
| 6,957,435 | B2 * | 10/2005 | Armstrong et al. | 718/104 |
| 6,978,374 | B1 * | 12/2005 | Hansen et al. | 713/183 |
| 6,988,134 | B2 | 1/2006 | Thorpe et al. | |
| 7,035,918 | B1 * | 4/2006 | Redding et al. | 709/223 |
| 7,089,306 | B2 | 8/2006 | Thorpe et al. | |
| 7,096,469 | B1 * | 8/2006 | Kubala et al. | 718/100 |
| 2002/0016892 | A1 * | 2/2002 | Zalewski et al. | 711/153 |
| 2002/0087611 | A1 * | 7/2002 | Tanaka et al. | 709/1 |
| 2002/0169625 | A1 * | 11/2002 | Yang et al. | 705/1 |
| 2005/0132347 | A1 * | 6/2005 | Harper et al. | 717/168 |
| 2005/0216716 | A1 * | 9/2005 | Hoffman et al. | 713/1 |
| 2006/0053215 | A1 * | 3/2006 | Sharma | 709/223 |

OTHER PUBLICATIONS

Chandra et al., Dynamic Resource Allocation for Shared Data Centers Using Online Measurements, Springer-Verlag Berlin Heidelberg, pp. 381-398, 2003.*
FLEXlm Reference Manual, Macrovision, Version 9.5, Aug. 2004.*
FLEXnet Licensing End User Guide, Macrovision, Version 10.8, Jul. 2005.*

* cited by examiner

*Primary Examiner* — Meng An
*Assistant Examiner* — Louis Diep

(57) ABSTRACT

A method comprises recognizing a need for an additional resource to be made available to a target computer workload. A determination is made whether said target workload is licensed for additional resource. If the determination is positive, the resource is transferred to the target workload. If the determination is negative, a license is transferred from a source workload, and then the resource is transferred to the target workload.

15 Claims, 2 Drawing Sheets

US 8,082,547 B1

REALLOCATING HARDWARE RESOURCES AMONG WORKLOADS IN ACCORDANCE WITH LICENSE RIGHTS

BACKGROUND OF THE INVENTION

Herein, related art may be discussed to put the invention in context. Related art labeled "prior art" is admitted prior art; related art not labeled "prior art" is not admitted prior art.

Servers, e.g., web servers, database servers, are computers that provide services to other computers. License fees for server software are often based on the hardware resources available to run the software. Thus, the fees for running software restricted to an 8-CPU partition of a 32-CPU server can be much less than software permitted to run on the full system.

Virtualization and other technologies provide for software-controlled reallocation of hardware resources to partitions. This means that restricting software to a partition does not restrict it to a fixed amount of resources. Accordingly, software licenses may have to provide for the maximum number of resources that can be allocated to a partition, which can lead to wasteful over-provisioning on the licensee's part. As is apparent from the detailed description below with reference to the following drawings, the present invention addresses the problem of license over-provisioning in servers that allow software-controlled reallocation of resources to partitions.

BRIEF DESCRIPTION OF THE DRAWING

The following drawing is of an embodiment of the invention and not of the invention itself.

DETAILED DESCRIPTION

The present invention provides a server workload management function that iteratively allocates software license rights along with hardware resources to workloads in a manner analogous to the allocation of hardware resources to workloads. Within each iteration, a resource (hardware or software license right or a combination) is allocated to the highest priority workload as defined by the policies and taking into account resources assigned during previous iterations. The end result is that both hardware resources and software license rights are distributed optimally as defined by management policies. With such an enforcement mechanism in place, a licensor can securely offer more limited and, thus, more economical, licenses to customers, reducing the need for a customer to over-provision licenses.

Figure 1:
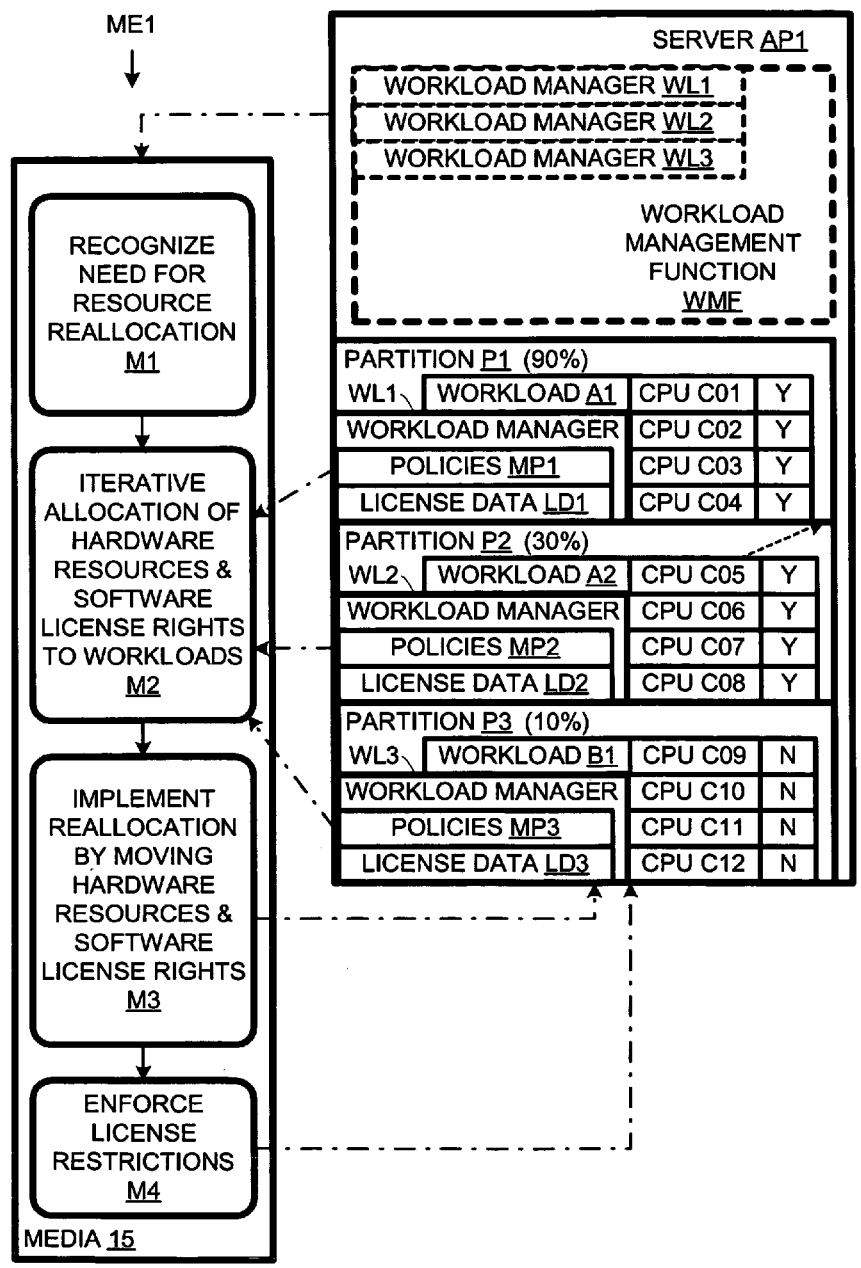
FIG. 1 is a schematic diagram of a server and associated method in accordance with an embodiment of the invention.

A server AP1 includes partitions P1-P3. Each partition has processor, memory, and input/output resources assigned to it. As shown in FIG. 1, processors (also known as "central processing units" (CPUs) C01-C04 are assigned to partition P1, CPUs C05-C08 are assigned to partition P2, and CPUs C09-C12 are assigned to partition P3.

Partitions P1-P3 are running respective workloads A1, A2, and B1. Each workload can include an operating system and one or more applications. Workloads A1 and A2 are two instances of the same application, e.g., the same database application, while workload B1 is an instance of another application. For example, the database application of workload A1 can be a database for one department of a company, while the database application of workload A2 can be running a second database for a different department of the company. Workload B1 can be a web server application.

The workload management function WMF is implemented by workload managers WL1-WL3, which are software agents running respectively in partitions P1-P3. Each workload manager WL1-WL3 has access to a respective copy of workload management policies MP1-MP3 and a respective copy of license data LD1-LD3. Collectively, workload managers WL1-WL3 provide for automated reallocation of resources. The reallocations are made based on policies MP1-MP3 and license data LD1-LD3.

More specifically, workload managers WL1-WL3 collectively implement a method ME1 flow-charted in FIG. 1 and shown tangibly embodied in computer readable storage media 15. At method segment M1, workload manager WL1 recognizes a need for more hardware resources to be allocated to its respective workload A1 running in partition P1. More specifically, workload manager WL1 has detected that 90% of the available CPU resources for partition P1 are being utilized. Policies MP1 indicated that CPU resources should be added to a partition at this level of utilization to provide adequate headroom for a potential spike in demand. As indicated in the alternative representation of method ME1 in FIG. 2, recognition of a need to reallocation can involve 1) a request from a workload manager for more resources, e.g., because of high utilization; 2) an offer by a workload manager to relinquish idle resources; 3) a scheduled reallocation (e.g., day versus night allocations); or 4) user initiated reallocations, as shown at method segment M1A.

Whether in response to a resource utilization problem or a scheduled event, a new allocation of resources to workloads is determined at method segment M2. Optimal resource allocation can be a complex problem. Method segment M2 breaks the problem down into iterations in which a single resource or a bundle of resources is assigned to a workload based on priorities determined by management policies MP1-MP3. Policy considerations can include the importance of the workload, the expected utilization of the workload, and the resources already allocated to the workload in previous iterations.

Figure 2:
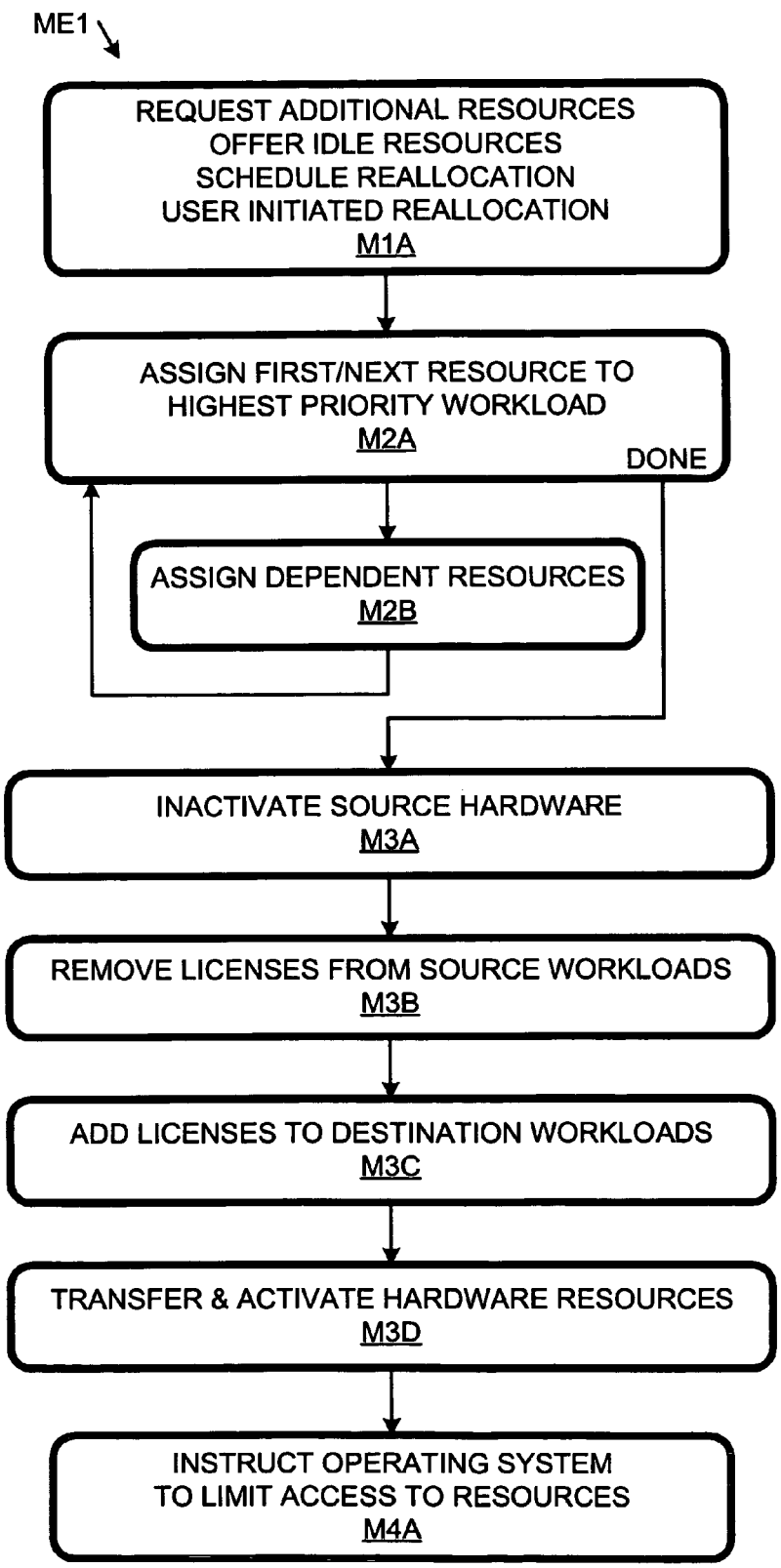
FIG. 2 is a more detailed flow chart of the method of FIG. 1.

As indicated in FIG. 2, planning a reallocation can involve assigning, at method segment M2A, a first minimum granularity resource unit to the highest priority workload as determined by management policies. Then, dependent resource allocations are made at method segment M2B. For example, if a partition runs two workloads, e.g., two virtual machines running on an OS, then a fraction of a CPU might be assigned to one of the workloads. However, the partition might have a minimum granularity of a whole CPU, so method segment M2A would involve assigning a fraction of a CPU to the workload and method segment M2B would involve assigning a whole CPU to the partition (if the resources previously assigned to that partition did not provide for the fraction).

Once the dependencies are assigned at method segment M2B, method ME1 returns to method segment M2A to allocate the next resource unit. Each time a resource is allocated at method segment M2A, its dependencies are assigned at method segment M2B unless all dependent resource assignments have already been made. When all resources have been assigned, method ME1 continues with method segment M3A.

In the case where the resource is a software license right, it can only be assigned to qualified workloads, e.g., one of perhaps plural instances of an operating system or application to which the right applies. For example, license data LD1-LD3 may indicate that a database program is licensed for up to four instances and a total of eight CPUs. Server AP1 can have two instances of the database, with one having a higher priority than the other. The first license right would be assigned to the higher priority instance. A later license right might be assigned to the same instance or to the lower priority instance (e.g., because the "needs" of the originally higher priority instance had been relatively satisfied). Hardware resources could then be assigned to workloads as license rights permit.

At method segment M3, the new allocation is implemented. Generally, reallocation can involve determining a license-compatible least-disruptive series of steps to implement the new allocation and then implementation of those steps. Method segment M3 of FIG. 1 can be broken down into method segments M3A-M3D as shown in FIG. 2 to ensure that license terms are complied with during the actual reallocation. At method segment M3A, source hardware is deactivated. At method segment M3B, license rights are removed from source workloads. At method segment M3C, license rights are added to the target workload. At method segment M3D, the inactivated hardware resources are transferred to the target workload and reactivated. Of course, if the new allocation is the same as the old, no changes are required.

Once the reallocation is implemented, method ME1 provides for enforcing licensing rights at method segment M4. If no workload has been assigned unlicensed resources, this enforcement is trivial. However there may be cases where a workload manager commands an operating system to limit access to hardware resources, as indicated at method segment 4A in FIG. 2. For example, the operating system might be licensed to use five cores, but the cores come four to a processor, the lowest unit that can be assigned to a partition. In that case, two processors and eight cores may be assigned to a partition, while the workload manager limits the operating system to using five cores.

In the illustrated case, the licenses for the database applications running in partitions P1 and P2 each permit four CPUs, but can be pooled so that licensing restrictions are met as long as the total number of CPUs for both partitions is no more than eight. In that case, "one CPU" of the license for partition P2 is transferred to partition P1 at method segment M4. Finally, one CPU, e.g., CPU C05 is transferred from partition P2 to partition P1, relieving the high utilization level of P1. (This is the transfer indicated by the arrow from CPU C05 to partition P1 in FIG. 1.) Moving a CPU to a different partition can involve several steps, including allowing threads running on it to terminate, preventing new threads from starting on that CPU, and then transferring the CPU.

It should be noted that the policies can specify conditions under which additional hardware and software licenses can be purchased. For example, a server may have reserved processors that can be "instantly activated" under a pre-arranged fee provision. Likewise, a software license might have provisions for instant expansion under a pre-arranged fee provision. Thus, when conditions merit, the amount of resources and license rights to be allocated can be varied by the workload management function.

Herein, "software agents" are computer programs, and a computer "workload" is a program or set of programs. Herein, a "computer program" or more simply a "program" is an ordered set of instructions tangibly embodied in computer-readable storage media and interpretable and executable by a central processing unit. Herein, "program" does not encompass purely abstract ideas, natural phenomena, or laws of nature. A "program set" is a set of one or more programs. All programs described herein effect changes in state in computer-readable memory.

While the invention is illustrated for a system with three hard partitions, it is applicable to systems with different numbers of partitions, and for systems with virtual instead of hard partitions. In fact, the invention can be applied to un-partitioned systems provided a workload manager controls the allocations of resources to workloads. The policies can involve utilization levels, usage predictions, and business priorities, among other considerations. The policies can seek to evenly distribute workloads or concentrate them so that some resources can be powered down. The license terms can vary and provide various means for augmenting a license to permit a reallocation, including automatic payment for an additional resource. The resources can be CPUs, memory, I/O devices, and various combinations and types of those classes of computer components. Now that multi-core processors are becoming prevalent, licensing and resource transfers can be on a per-core rather than a per-CPU basis. Fractional resource transfers can also be implemented, e.g., by time-sharing a resource such as a CPU or core. These and other variations upon and modifications to the illustrated embodiment are provided for by the present invention, the scope of which is defined by the following claims.

What is claimed is:

1. A computer-implemented method comprising:
   planning a resource reallocation by progressively assigning resource units to respective workloads in an iterative procedure including a series of iterations so that a number of said resource units assigned to said workloads at the end of any iteration for which there is a preceding iteration in said series is greater than a number of resource units assigned to said workloads by the end of that preceding iteration, said resource units including plural hardware resource units that are assigned during respective ones of said iterations, said resource units including plural software license rights that are assigned during respective ones of said iterations, said iterative procedure ending once all of said resource units have been assigned; and
   once all of said resource units have been assigned and said iterative procedure has ended, implementing said resource reallocation, said implementing including transferring hardware resource units and software license rights between said workloads, each of said software rights, when transferred to a target workload, increasing an amount of said hardware resource units on which the target workload is licensed to run.

2. A method as recited in claim 1 further comprising recognizing a need for reallocating said hardware resource units prior to said iteratively assigning, each of said iterations including identifying a highest priority workload and assigning a resource unit to it.

3. A method as recited in claim 1 wherein said implementing involves transferring a license right from a first workload running in a first partition to a second workload running in a second partition and transferring a hardware resource unit from a third partition to said second partition, said third partition being separate from said first partition, each of said partitions being a container for resource units.

4. A method as recited in claim 1 further including enforcing constraints associated with said software license rights after said implementing by limiting access by a first workload running in a partition to a subset of a set of said hardware resource units allocated to that partition.

5. A method as recited in claim 4 wherein said first workload is licensed to use some hardware resource units of said subset but not hardware resource units of said set that are not in said subset.

6. A computer system comprising:
plural partitions for running respective workloads, said partitions including a first partition;
hardware resources distributed among said plural partitions;
a first workload running in said first partition and having first software license rights, said first software license rights defining at any given time a first licensed set of said resources on which said first workload is licensed to run and an unlicensed set of said resources on which said workload is not licensed to run;
workload management policies defining criteria for when and how said resources are to be allocated among said workloads;
a workload manager including plural workload management programs running in respective different ones of said partitions for collectively planning and implementing a reallocation of said resources in accordance with said policies and said first software license rights by identifying to which of said sets a hardware resource belongs and reallocating said hardware resource to said first workload provided that hardware resource belongs to said licensed set; and
a second workload having second software license rights corresponding to an amount of hardware resources on which said second workload is licensed to run, said workload manager providing for transferring some of said second software license rights to said first workload so as to augment said first software license rights so that said hardware resource can be allocated to said first workload even if said hardware resource did not belong to said licensed set before said transferring.

7. A computer system as recited in claim 6 wherein said workload manager includes software agents running in said partitions.

8. A computer system as recited in claim 6 wherein said workload manager has access to license data regarding said workloads and said software license rights.

9. A computer system as recited in claim 6 further comprising a third workload running on resources belonging to said unlicensed set.

10. A computer product comprising non-transitory computer-readable storage media encoded with code configured to, when executed by one or more processors:
plan a reallocation by progressively allocating resource units to respective workloads in an iterative procedure including a series of iterations so that a number of said resource units assigned to said workloads at the end of any iteration for which there is a preceding iteration in said series is greater than a number of resource units assigned to said workloads by the end of that preceding iteration, said resource units including plural hardware resource units that are assigned during respective ones of said iterations, said resource units including plural software license rights that are assigned during respective ones of said iterations, said iterative procedure ending once all of said resource units have been assigned; and
once all of said resource units have been assigned and said iterative procedure has ended, implement said reallocation, said implementing including transferring hardware resource units and software license rights between said workloads, each of said software rights, when transferred to a target workload, increasing an amount of said hardware resource units on which the target workload is entitled to run.

11. A computer product as recited in claim 10 wherein said implementing involves:
inactivating at least some of said hardware resource units;
removing at least some of said software licensing rights from source workloads of said workloads;
adding said at least some of said software licensing rights to destination workloads of said workloads; and
transferring said at least some hardware resource units so that they can be accessed by said destination workloads.

12. A computer product as recited in claim 11 wherein said destination workload is running in a destination partition and said transferring involves transferring hardware resource units to said destination partition.

13. A computer product as recited in claim 12 further comprising, after said implementing, limiting access of said destination workload to some hardware resource units of said destination partition so as to comply with software license rights allocated to said destination workload.

14. A computer product as recited in claim 10 further comprising said one or more processors.

15. A computer product as recited in claim 10 wherein each of said iterations including identifying a highest priority workload and assigning a resource unit to it.

* * * * *